(12) United States Patent
Zhang et al.

(10) Patent No.: US 11,269,247 B2
(45) Date of Patent: Mar. 8, 2022

(54) LIGHT SOURCE MODULE AND PROJECTION DEVICE USING THE SAME

(71) Applicant: Qisda Corporation, Taoyuan (TW)

(72) Inventors: Jia-Ming Zhang, Hsinchu (TW); Chien-Chiang Hsu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/997,049

(22) Filed: Aug. 19, 2020

(65) Prior Publication Data
US 2021/0055642 A1 Feb. 25, 2021

(30) Foreign Application Priority Data
Aug. 20, 2019 (CN) .......................... 201910770634.8

(51) Int. Cl.
*G03B 21/14* (2006.01)
*G03B 21/20* (2006.01)
*G02B 3/00* (2006.01)
*G02B 26/00* (2006.01)
*G02B 27/14* (2006.01)

(52) U.S. Cl.
CPC ......... *G03B 21/204* (2013.01); *G02B 3/0056* (2013.01); *G02B 26/008* (2013.01); *G02B 27/141* (2013.01); *G03B 21/2013* (2013.01); *G03B 21/2066* (2013.01)

(58) Field of Classification Search
CPC .............. G03B 21/204; G03B 21/2013; G03B 21/2066; G02B 26/008; G02B 27/141
USPC ....................................................... 353/38, 84
See application file for complete search history.

(56) References Cited

U.S. PATENT DOCUMENTS

| 8,957,366 | B2 | 2/2015 | Miyazaki | |
| 9,964,842 | B2* | 5/2018 | Hashizume | G03B 21/208 |
| 2016/0091782 | A1* | 3/2016 | Hashizume | G03B 21/204 |
| | | | | 353/84 |
| 2018/0059523 | A1* | 3/2018 | Takagi | G03B 21/2053 |
| 2019/0331990 | A1 | 10/2019 | Zhang et al. | |
| 2021/0216004 | A1* | 7/2021 | Yasumatsu | G03B 21/2073 |
| 2021/0223672 | A1* | 7/2021 | Yokoo | G03B 21/204 |

FOREIGN PATENT DOCUMENTS

| CN | 102081210 A | 6/2011 |
| CN | 103034036 A | 4/2013 |
| CN | 107479313 A | 12/2017 |
| CN | 108761981 A | 11/2018 |

\* cited by examiner

*Primary Examiner* — William C. Dowling (57) ABSTRACT

A light source module for providing an illumination light includes a light source configured to provide a first beam of a first waveband, a microlens array disposed corresponding to the light source and configured to uniform the first beam, a first lens set configured to focus at least a portion of the first beam uniformed by the microlens array, and a wavelength conversion unit configured to convert at least a portion of the first beam focused by the first lens set into a second beam of a second waveband different from the first waveband, wherein the second beam and the first beam not converted by the wavelength conversion unit together form the illumination light.

16 Claims, 8 Drawing Sheets

LIGHT SOURCE MODULE AND PROJECTION DEVICE USING THE SAME

BACKGROUND OF THE INVENTION

1. Field of the Invention

The invention generally relates to a light source module. Particularly, the invention relates to a light source module capable of generating light of a specific color in a non-sequential manner and a projection device having the same.

2. Description of the Prior Art

Projectors are widely used in various occasions, such as schools, exhibitions or conferences. With the evolution of technology and consumer demand, the development of projectors has been improved towards lighter weight or energy-saving. A major change comes from the change of the light source, which is improved from high-intensity discharge (HID) lamps to light-emitting diodes (LEDs). This improvement can significantly reduce volume and increase energy conversion efficiency.

Recently, projectors usually use blue laser diodes to provide the illumination light. The illumination light needs to be converted into an excited light of other colors by wavelength conversion, and the excited light is then combined with the illumination light for use. However, the light beam obtained from the blue laser diode is generally poor in uniformity and difficult in shaping, resulting in low wavelength conversion efficiency. Therefore, how to improve the uniformity of light beam and to integrate the optical path in the light-combining system has become one of the important issues in development of light source modules or projectors.

SUMMARY OF THE INVENTION

It is an object of the invention to provide a light source module, which utilizes the microlens array to uniform light beam so as to improve the conversion efficiency of the wavelength conversion unit.

It is another object of the invention to provide a light source module, which utilizes the designed optical path to generate light of a specific color, such as white light, as the illumination light in a non-sequential manner.

In an embodiment, the invention provides a light source module for providing an illumination light including a light source configured to provide a first beam of a first waveband, a microlens array disposed corresponding to the light source and configured to uniform the first beam, a first lens set configured to focus at least a portion of the first beam uniformed by the microlens array, and a wavelength conversion unit configured to convert at least a portion of the first beam focused by the first lens set into a second beam of a second waveband different from the first waveband, wherein the second beam and the first beam not converted by the wavelength conversion unit together form the illumination light.

In an embodiment, the microlens array includes multiple microlens elements. The microlens array uniforms the first beam by splitting the first beam into multiple first sub-beams of the first waveband by the microlens elements.

In an embodiment, the wavelength conversion unit includes a substrate having a light-transparent portion and a wavelength conversion layer disposed on the substrate. The light-transparent portion is configured to allow the first beam to transmit therethrough; the light-transparent portion at least partially overlaps the wavelength conversion layer, wherein the first beam transmits through the light-transparent portion to the wavelength conversion layer, so that the wavelength conversion layer is excited by the first beam to generate the second beam.

In an embodiment, the first beam not converted by the wavelength conversion layer is a portion of the first beam transmitting through a portion of the light-transparent portion not overlapping the wavelength conversion layer or a portion of the first beam transmitting through the light-transparent portion and the wavelength conversion layer without being converted by the wavelength conversion layer.

In an embodiment, the wavelength conversion unit further includes a dichroic film disposed on the substrate and partially located between the light-transparent portion and the wavelength conversion layer; the dichroic film is configured to allow the first beam to transmit therethrough and reflect the second beam.

In embodiment, the light source module further includes a dichroic member disposed between the microlens array and the first lens set, wherein the dichroic member is configured to reflect at least a portion of the first beam uniformed by the microlens array, and the second beam at least partially transmits through the dichroic member from the first lens set.

In an embodiment, the wavelength conversion unit includes a substrate having a reflective surface, and a wavelength conversion layer disposed on the substrate adjacent to the reflective surface. The reflective surface is configured to reflect the first beam. The first beam is incident on the reflective surface and the wavelength conversion layer at the same time, so that the wavelength conversion layer is excited by the first beam to generate the second beam toward a predetermined direction, and a first central axis of the first lens set and a second central axis of the dichroic member is shifted from each other, so that the first beam is partially reflected from the reflective surface, transmits through the first lens set, and bypasses the dichroic member to form the first beam not converted by the wavelength conversion unit.

In an embodiment, the light source module further includes a reflector disposed at another side of the dichroic member opposite to the first lens set. The first beam uniformed by the microlens array partially bypasses the dichroic member to the reflector and is then reflected from the reflector to the dichroic member to be reflected from the dichroic member to form the first beam not converted by the wavelength conversion unit.

In an embodiment, the light source module further includes a second lens set disposed between the dichroic member and the reflector, wherein the second lens set is configured to focus the first beam bypassing the dichroic member to the reflector.

In an embodiment, the light source module further includes at least a diffuser disposed at least between the light source and the microlens array, between the microlens array and the first lens set, between the microlens array and the dichroic member, and/or between the dichroic member and the reflector.

In an embodiment, the light source module further includes a third lens set disposed between the light source and the microlens array and configured to focus the first beam provided by the light source.

In an embodiment, the first beam is a blue light, the second beam is a yellow light, and the illumination light is a white light.

In another embodiment, the invention provides a projection device including the light source module described above and a light processing unit configured to receive the illumination light to form an image light, wherein the image light forms an image on a plane.

Compared with the prior art, the invention uses the microlens array to split light beam into multiple sub-beams, which are then focused overlappingly onto the wavelength conversion unit, so that the distribution of energy is more uniform to improve the conversion efficiency of the wavelength conversion unit and to increase the brightness of the combined illumination light so as to enhance the image quality. Moreover, the light source module of the invention is designed according to the optical path characteristic, so as to provide the illumination light of a specific color in a non-sequential manner.

DETAILED DESCRIPTION OF THE PREFERRED EMBODIMENT

Elements of the light source module of the invention can be integrated with a suitable housing to form an integral modular configuration, which can be applied to various display devices and illumination devices. For example, the light source module is preferably applied to a projection device to function as an illumination light source of the projection device, but not limited thereto. In other embodiments, according to design needs, the light source module can be applied to any electronic devices, which require an illumination light source. Moreover, the light source module of the invention can be disposed in the housing of an electronic device, such as projector, and is not limited to the integral modular configuration. Hereinafter, embodiments of the light source module and the projection device of the invention will be described in detail with reference to the drawings.

Figure 1:
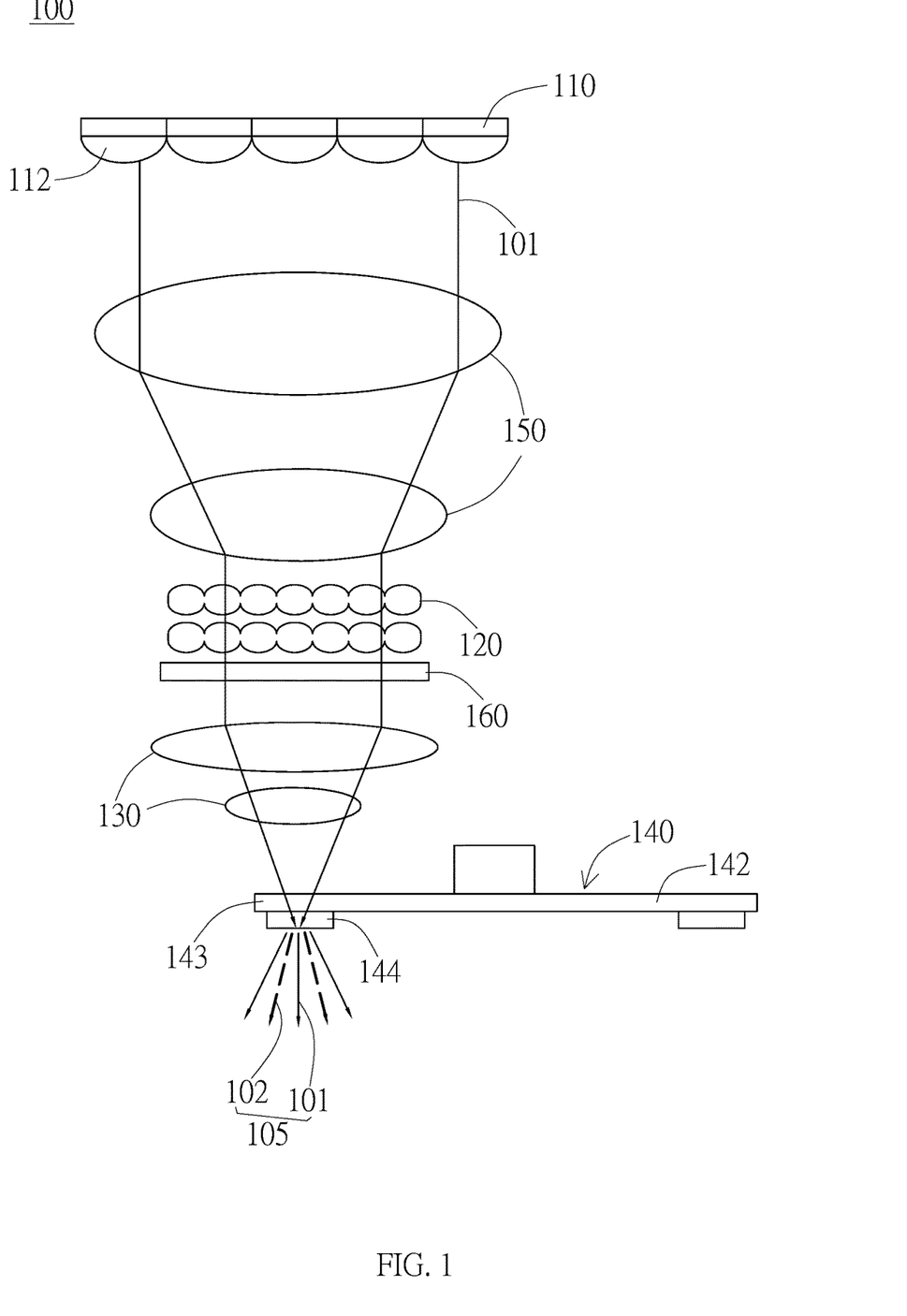
FIG. 1 is a schematic view of the light source module in an embodiment of the invention.

FIG. 1 is a schematic view of the light source module in an embodiment of the invention. As shown in FIG. 1, the light source module 100 is configured to provide an illumination light 105. The light source module 100 includes a light source 110, a microlens array 120, a first lens set 130, and a wavelength conversion unit 140. The light source 110 is configured to provide a first beam 101 of a first waveband. The microlens array 120 is disposed corresponding to the light source 110 and configured to uniform the first beam 101. The first lens set 130 is configured to focus at least a portion of the first beam 101. The wavelength conversion unit 140 is configured to convert at least a portion of the first beam 101, which is focused by the first lens set 130, into a second beam 102 of a second waveband different from the first waveband. The second beam 102 and the first beam 101 not converted by the wavelength conversion unit 140 together form the illumination light 105.

Specifically, the light source 110 is preferably a light-emitting element of high light-emitting efficiency and reduced volume, such as light-emitting diode (LED) or laser diode. In an embodiment, the light source 110 preferably includes a plurality of light-emitting elements 112, and the plurality of light-emitting elements 112 are arranged in an array to form a surface light source. Moreover, the color (or wavelength) of light emitted from the light source 110 can be modified according to the wavelength conversion unit 140, so that the illumination light 105 formed by combining the first beam 101 that is not converted by the wavelength conversion unit 140 and the generated second beam 102 can have a desired color. In an embodiment, the illumination light 105 is preferably a white light, but not limited thereto. For example, when the illumination light 105 is a white light, the light source 110 preferably includes a blue laser diode, so the first beam 101 is a blue light. In other words, the wavelength of the first beam 101 preferably falls within the first waveband, such as blue light waveband of 380~476 nm.

Figure 2:
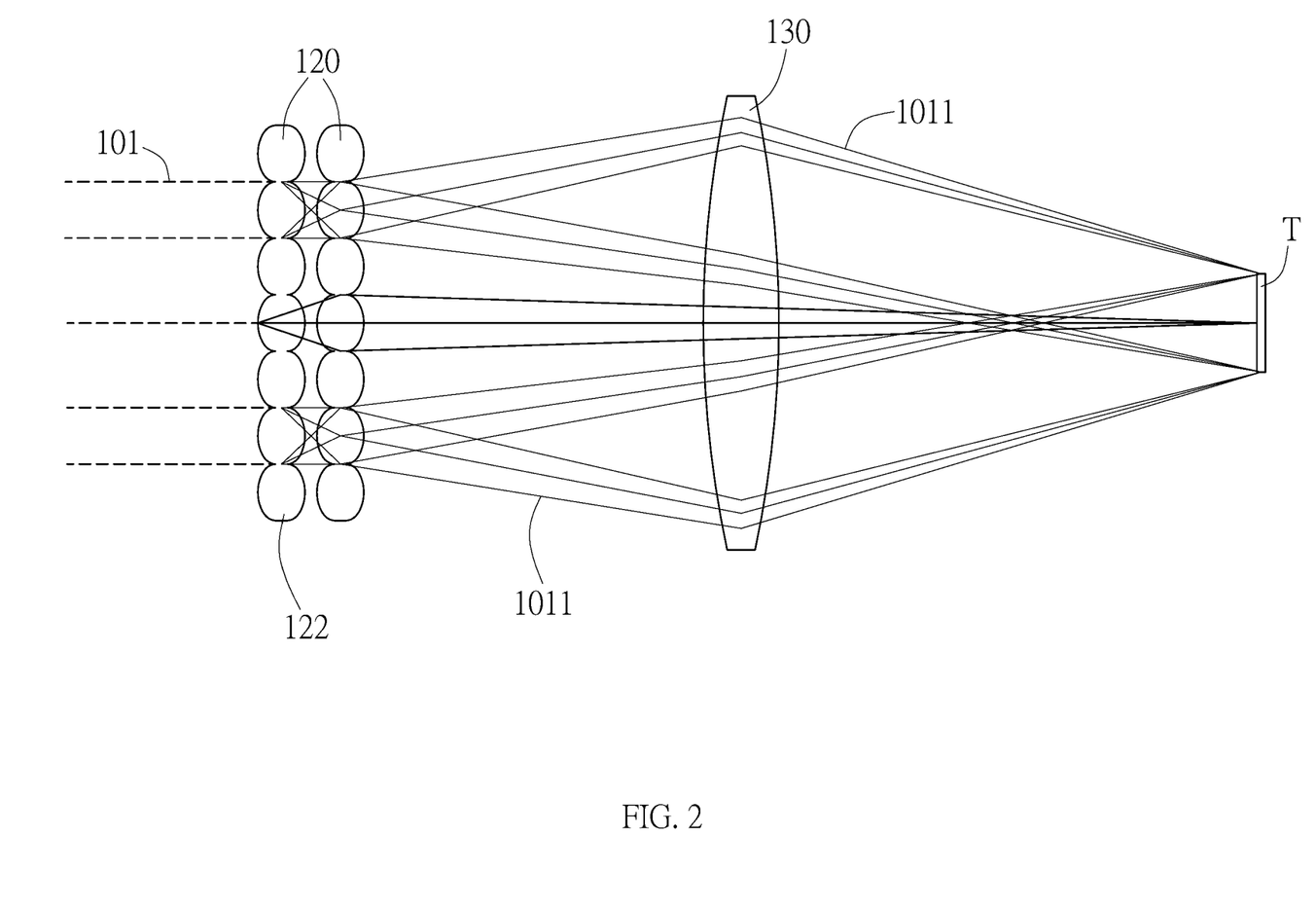
FIG. 2 is a schematic view of the operation of the microlens array in an embodiment of the invention.

As shown in FIG. 2, the microlens array 120 includes a plurality of microlenses 122. The microlens array 120 uniforms the first beam 101 by splitting the first beam 101 into a plurality of first sub-beams 1011 of the first waveband by the microlenses 122. Specifically, the microlens array 120 contains multiple microlenses 122 formed in a one-dimensional or two-dimensional array on a supporting substrate. The multiple microlenses 122 split the surface light source into multiple portions, and each portion is laminated on the target substrate T (such as the wavelength conversion unit 140) through other lenses, so that a uniform projection surface light can be obtained. Moreover, the shape of the beam can be modified according to the shape of the apertures of the microlenses to achieve the effect of shaping the beam. For example, the first beam 101 emitted from the light source 110 is split into multiple first sub-beams 1011 by the microlenses 122, and the wavelength of the first sub-beams 1011 falls within the first waveband. That is, the first beam 101 and the first sub-beams 1011 are same in waveband, such as blue light waveband, and the first beam 101 uniformed by the microlens array 120 includes the multiple first sub-beams 1011. The first sub-beams 1011 are focused by the first lens set 130 and overlapped on the wavelength conversion unit 140 to obtain light spots with uniform energy, so as to uniform the first beam 101. As such, the conversion efficiency of the wavelength conversion unit 140, which is excited by the uniformed first beam 101 to generate the second beam 102, can be improved. The light source module 10 may include one or more microlens arrays 120, and the microlens arrays 120 are preferably disposed in pairs, but not limited thereto. In another embodiment, the light source module 10 may include only a single microlens array 120.

The first lens set 130 can include one or more lenses, which are configured to focus at least a portion of the first beam 101 after being uniformed by the microlens array 120. For example, as shown in FIG. 1, the first lens set 130 includes two lenses, which focus the first sub-beams 1011 on the wavelength conversion unit 140 overlappingly, but not limited thereto. In another embodiment, as shown in FIG. 2, the first lens set 130 can include only one lens.

Figure 3A:
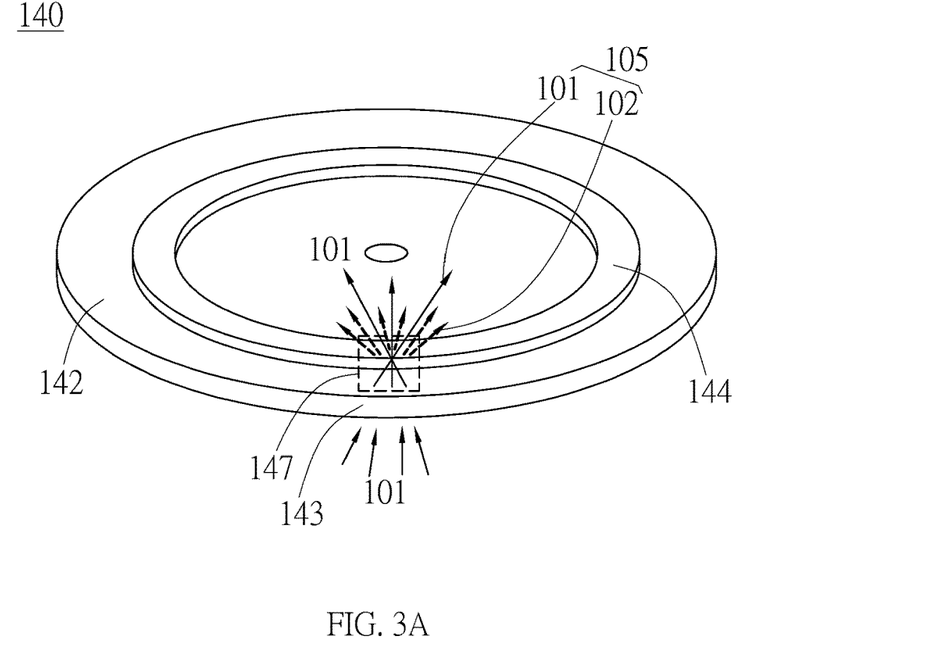
FIGS. 3A and 3B are schematic views of the wavelength conversion unit in different embodiments of the invention.

In an embodiment, the wavelength conversion unit 140 includes a substrate 142 and a wavelength conversion layer 144. The substrate 142 has a light-transparent portion 143, which allows the first beam 101 to transmit therethrough. The wavelength conversion layer 144 is disposed on the substrate 142, and the light-transparent portion 143 at partially overlaps the wavelength conversion layer 144. The first beam 101 is incident on the wavelength conversion layer 144 through the light-transparent portion 143, so that the second beam 102 is generated by the wavelength conversion layer 144 which is excited by the first beam 101. In other words, the wavelength conversion layer 144 is preferably disposed on the light exit side of the substrate 142, so that the first beam 101 transmits through the light-transparent portion 142 and then arrives the wavelength conversion unit 144. In an embodiment, the substrate 142 can be embodied as a light-transparent substrate, such as glass substrate or polymer substrate to allow the first beam 101 to transmit therethrough, i.e., the entire substrate 142 can be the light transparent portion 143. In another embodiment (not shown), the substrate 142 can be a non-transparent substrate having the light transparent portion 143, so that the first beam 101 can transmit through the substrate 142 only from the light-transparent portion 143. The wavelength conversion layer 144 is disposed on the substrate 142 corresponding to the light transparent portion 143, so that the first beam 101 can be incident on the wavelength conversion layer 144 through the light transparent portion 143. The wavelength conversion layer 144 can be excited by the portion of the first beam 101 incident on the wavelength conversion layer 144 to generate the second beam 102. In an embodiment, as shown in FIG. 3A, the wavelength conversion unit 140 can be a color wheel, and the wavelength conversion layer 144 is disposed on the substrate 142 in a closed ring configuration. The driving device (such as a motor) drives the substrate 142 to rotate, so as to drive the wavelength conversion layer 144 to change the region excited by the first beam 101, improving the conversion efficiency and extending the service life of the wavelength conversion unit 140. The wavelength conversion layer 144 can include materials, such as phosphor powders or quantum dots, which can directly or indirectly convert light energy when under excitation. According to the material of the wavelength conversion layer 144, the wavelength of light converted therefrom can be modified. For example, YAG (yttrium aluminium garnet) phosphor powders can generate light in a waveband of 550 nm to 560 nm. The wavelength conversion layer 144 can be modified according to, for example, the wavelength of the first beam 101, the wavelength of the generated second beam 102, the wavelength of the illumination light 105. In an embodiment, when the illumination light 105 is a white light, the wavelength conversion layer 144 preferably includes yellow phosphor powders coated on the light-transparent portion 143 of the substrate 142, so that the first beam 101 (such as blue light) transmitting through the light-transparent portion 143 can excite the wavelength conversion layer 144 to generate the second beam 102, such as yellow light.

In an embodiment, the first beam 101 not converted by the wavelength conversion unit 140 includes (1) the first beam 101 that transmits through the portion of the light-transparent portion 143 that does not overlap the wavelength conversion layer 144, and/or (2) the first beam 101 that transmits through the light-transparent portion 143 and the wavelength conversion layer 144 but is not converted by the wavelength conversion layer 144. For example, the wavelength conversion layer 144 can be disposed to only partially overlap the light-transparent portion 143, so that a portion of the light-transparent portion 143 is not disposed with the wavelength conversion layer 144 thereon. When the first lens set 130 focuses the first beam 101 onto the light-transparent portion 143, the irradiation range 147 of the first beam 101 covers at least a region where the light-transparent portion 134 overlaps the wavelength conversion layer 144. As such, a portion of the first beam 101 can transmit through the light-transparent portion 143 to excite the wavelength conversion layer 144 so as to generate the second beam 102, and the portion of the light beam 101 possibly partially also transmits through the wavelength conversion layer 144 without being converted. Another portion of the first beam 101 can directly transmit through the portion of the light-transparent portion 143 without the wavelength conversion layer 144 thereon. As such, the second beam 102 generated by the wavelength conversion layer 144 and the first beam 101, which transmits through the light transparent portion 143 and/or through the light transparent portion 143 and the wavelength conversion layer 144 (i.e., non-converted first beam 101), can be combined to form the illumination light 105.

Figure 3B:
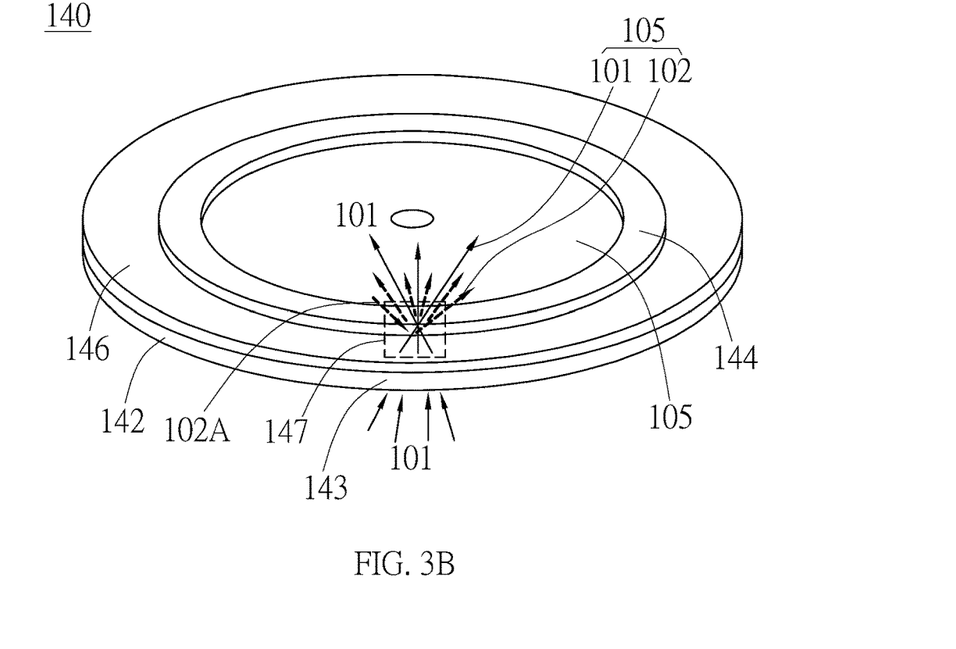

In another embodiment, as shown in FIG. 3B, the wavelength conversion unit 140 further includes a dichroic film 146. The dichroic film 146 is disposed on the substrate 142 and partially located between the light-transparent portion 143 and the wavelength conversion layer 144. The dichroic film 146 is an optical element, which allows lights of a specific waveband to transmit therethrough and reflects lights of another specific waveband. For example, the dichroic film 146 can be a dichroic mirror or a color filter, which has an optical coating on the light incident region according to required optical properties. In this embodiment, the dichroic film 146 is preferably configured to allow the first beam 101 to transmit therethrough and reflect the second beam 102. For a white illumination light 105, the dichroic film 146 preferably allows blue light to transmit therethrough and reflects yellow light. In an embodiment, the dichroic film 146 is disposed at least on the region where the light-transparent portion 143 overlaps the wavelength conversion layer 144. With such a configuration, the first beam 101 transmits through the light-transparent portion 143 and the dichroic film 146, so as to excite the wavelength conversion layer 144 to generate the second beam 102, and the dichroic film 146 reflects the second beam (such as 102A), which travels toward the substrate 142, away from the substrate 142 toward the light-combining direction with the first beam 101, so as to enhance the light conversion efficiency of the wavelength conversion layer 144.

Moreover, according to practical requirements and designed optical paths, the light source module 100 may optionally include other optical elements to achieve a desired optical effect. For example, as shown in FIG. 1, the light source module 100 can further include another lens set (such as a third lens set 150) and at least one diffuser (such as the diffuser 160). In this embodiment, the third lens set 150 preferably disposed between the light source 110 and the microlens array 120 along the optical path and configured to focus the first beam 101 provided by the light source 110. The diffuser 160 is configured to enhance the uniformity of the beam, and the diffuser 160 can be disposed between the light source 110 and the microlens array 120 or between the microlens array 120 and the first lens set 130 along the optical path, so as to enhance the uniformity of the beam.

Referring to FIG. 1, the optical path of the light source module 100 for providing a white illumination light 105 will be described. As shown in FIG. 1, the first beam 101 (e.g. blue light) provided by the light source 110 is focused by the third lens set 150 onto the microlens array 120. The microlens array 120 splits the first beam 101 into multiple first sub-beams 1011 (shown in FIG. 2) to uniform and shape the first beam 101. The diffuser 160 is disposed at the downstream (or upstream) of the optical path with respect to the microlens array 120 to enhance the uniformity of the first beam 101. The first lens set 130 focuses the first beam 101 uniformed by the microlens array 120 (or diffuser 160, if exists) onto the wavelength conversion unit 140. The first beam 101 transmits through the light-transparent portion 143 of the substrate 142 incident on the wavelength conversion layer 144, so that the wavelength conversion layer 144 is excited by the first beam 101 to generate the second beam 102 (e.g. yellow light). The second beam 102 is combined with the first beam 101 not converted by the wavelength conversion layer 144 (e.g. the first beam 101 travels according the above optical paths (1), (2)) to form the illumination light 105. As such, the light source module can provide a white illumination light 105 in a non-sequential manner.

Figure 4:
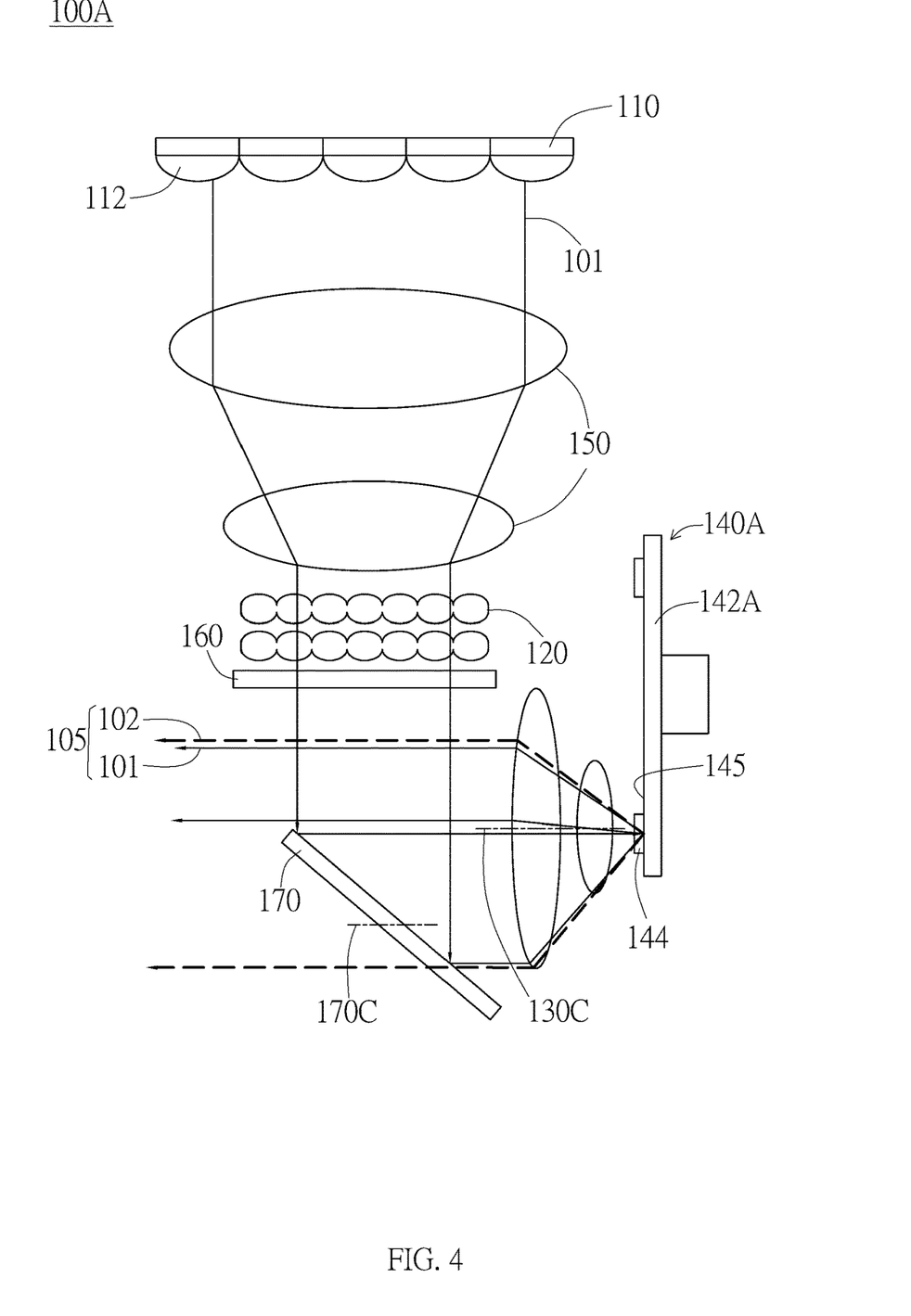
FIG. 4 is a schematic view of the light source module in another embodiment of the invention.

According to the space application and the optical path design, the light source module of the invention can have different configurations to provide the first beam 101 and the second beam 102 to form the illumination light 105. In another embodiment, as shown in FIG. 4, the light source module 100A further includes a dichroic member 170, which is disposed corresponding to the microlens arrays 120, and the wavelength conversion unit 140A is employed. The differences of the embodiments of FIG. 4 and FIG. 1 will be explained, and the details of other elements (e.g. light source 110, lens sets 130 and 150, microlens array 120, diffuser 160) can be referred to the related descriptions of the above embodiment, and will not be elaborated again.

In this embodiment, the dichroic member 170 is disposed between the microlens array 120 (or the diffuser 160, if exists at the downstream of the optical with respect to the microlens array 120) and the first lens set 130. In other words, the dichroic member 170 is disposed at the upstream of the optical path with respect to the first lens set 130. The dichroic member 170 is an optical element, which allows lights of a specific waveband to transmit therethrough and reflects lights of another specific waveband. For example, the dichroic member 170 can be a dichroic mirror or a color filter, which has an optical coating on the light incident region according to required optical properties. In this embodiment, the dichroic member 170 is preferably configured to allow the second beam 102 to transmit therethrough and reflect the first beam 101. Specifically, the dichroic member 170 preferably reflects at least a portion of the first beam 101 uniformed by the microlens array 120 to the first lens set 130, and the second beam 102 at least partially transmits through the dichroic member 170 from the first lens set 130.

Figure 5A:
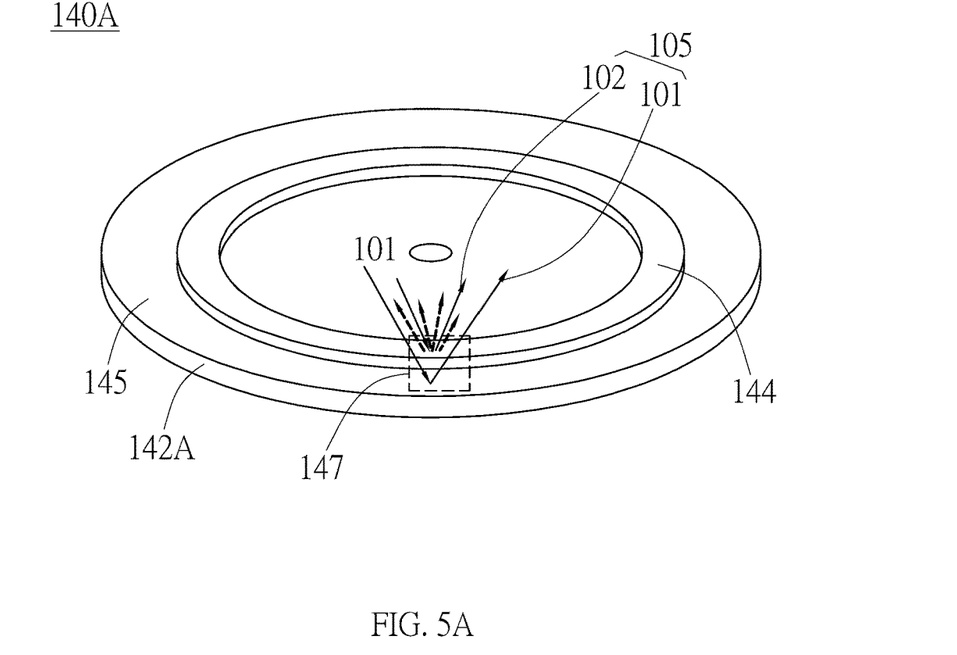
FIGS. 5A and 5B are schematic views of the wavelength conversion unit in other embodiments of the invention.

Corresponding to the disposition of the dichroic member 170, as shown in FIG. 5A, in an embodiment, the wavelength conversion unit 140A includes a substrate 142A and a wavelength conversion layer 144. The substrate 142A has a reflective surface 145, which is configured to reflect the first beam 101. In an embodiment, the reflective surface 145 can be configured to reflect the second beam 102 too. In this embodiment, the substrate 142A can be embodied as a metal plate, such as aluminium plate, and the reflective surface 145 is the outer surface of the substrate 142A. In another embodiment, the substrate 142A can be formed by reflective or non-reflective materials, and a reflective material or a reflective film is then disposed on the surface of the substrate 142A by adhering or coating to form the reflective surface 145, so that the reflective surface 145 preferably faces outward from the substrate 142A. The wavelength conversion layer 144 is disposed on the substrate 142A adjacent to the reflective surface 145. In this embodiment, the wavelength conversion layer 144 and the reflective surface 145 are preferably disposed on the same side of the substrate 142A. When the first beam 101 irradiates the wavelength conversion unit 140A from the light incident side, the first beam 101 preferably is incident on the reflective surface 145 and the wavelength conversion layer 144 at the same time, as shown by the irradiation range 147, so that the wavelength conversion layer 144 is excited to generate the second beam 102 toward a predetermine direction, such as toward the first lens set 130. Specifically, when the first beam 101 is incident on the reflective surface 145 and the wavelength conversion layer 144 at the same, the first beam 101 incident on the reflective surface 145 is reflected from the reflected surface 145 toward the first lens set 130, and the first beam 101 incident on the wavelength conversion layer 144 excites the wavelength conversion layer 144 to generate the second beam 102 toward the predetermined direction to transmit through the first lens set 130.

In another embodiment, the reflective surface 145 preferably extends between the wavelength conversion layer 144 and the substrate 142A. In other words, the wavelength conversion layer 144 is partially disposed on the reflective surface 145, so that a portion of the reflective surface 145 has the wavelength conversion layer 144 disposed thereon, and another portion of the reflective surface 145 adjacent to the wavelength conversion layer 144 is exposed without the wavelength conversion layer 144 covering thereon. As such, the second beam 102, that is generated by exciting the wavelength conversion layer 144 by the first beam 101 and travels toward the substrate 142A, can be reflected by the reflective surface 145 between the wavelength conversion layer 144 and the substrate 142A toward the predetermined direction, such as toward the first lens set 130, to promote the brightness of the second beam 102, but not limited thereto.

Figure 5B:
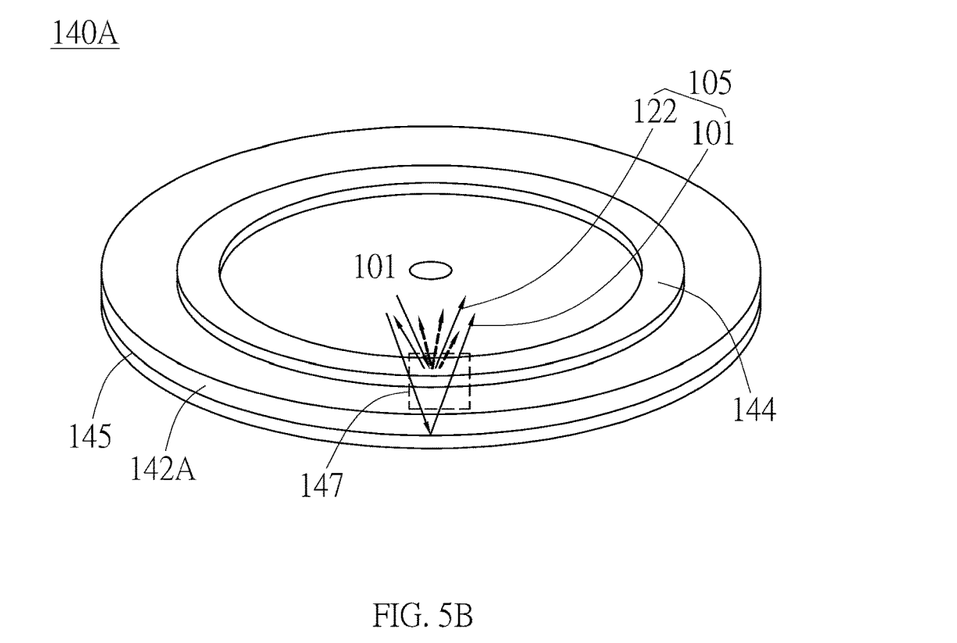

In another embodiment, as shown in FIG. 5B, the substrate 142A can be a light-transparent substrate, and the reflective surface 145 and the wavelength conversion layer 144 are disposed on two opposite sides of the substrate 142A, such as light incident side and light exit side, respectively. For example, the reflective surface 145 can be a reflective film, which is attached to the substrate 142A and overlaps the wavelength conversion layer 144 with the substrate 142A interposed therebetween. The reflective surface 145 faces the inner side of the substrate 142A, i.e., faces toward the wavelength conversion layer 144, and the area of the reflective surface 145 is preferably larger than the wavelength conversion layer 144. When the first beam 101 irradiates the wavelength conversion unit 140A from the light incident side, the first beam 101 is preferably incident on the reflective surface 145 and the wavelength conversion layer 144 at the same time, as shown by the irradiation range 147, so that a portion of the first beam 101 transmits through the substrate 142A and is then reflected from the reflective surface 145 toward the first lens set 130, and another portion of the first beam 101 is incident on the wavelength conversion layer 144, which is excited by the first beam 101 to generate the second beam 102 toward a predetermine direction, such as toward the first lens set 130. The portion of the second beam 102, which travels toward the substrate 142A, can be reflected from the reflective surface 145 disposed on the light exit side toward a predetermined, such as toward the first lens set 130, to enhance the brightness of the second beam 102.

As shown in FIG. 4, the first lens set 130 and the dichroic member 170 have a first central axis 130C and a second central axis 170C, respectively. The second central axis 170C of the dichroic member 170 and the first central axis 130C of the first lens set 130 are shifted from each other in a predetermined direction, so that the first beam 101, which is reflected from the reflected surface 145 and transmits through the first lens set 130, can bypass the dichroic element 170 to form the first beam 101 that is not converted by the wavelength conversion unit 140. Specifically, the dichroic member 170 is preferably disposed off-axis with respect to the first lens set 130, so that the second central axis 170C of the dichroic member 170 is located on one side with respect to the first central axis 130 of the first lens set 130 without overlapping each other. With such a configuration, the portion of the first beam 101 that is reflected from the reflective surface 145 toward the first lens set 130 will transmit through the first lens set 130 and bypass the dichroic member 170, i.e., without interfering with the dichroic member 170, and then travels to form the illumination light 105 with the second beam 102. For example, the dichroic member 170 is disposed at the lower side with respect to the first central axis 130C of the first lens set 130, so that at least a portion of the first beam 101 that is reflected by the reflective surface 145 and transmits through the first lens set 130 will pass from the above of the dichroic member 170 and is not incident to the dichroic member 170, i.e., will not be reflected by the dichroic member 170, so as to form the illumination light 105 with the second beam 102.

Referring to FIG. 4, the optical path of the light source module 100A for providing a white illumination light 105 will be described. As shown in FIG. 4, the first beam 101 (e.g., blue light) provided by the light source 110 is focused on the microlens array 120 by the third lens set 150. The first beam 101 is split into multiple first sub-beams 1011 (referring to FIG. 2) by the microlens array 120 so as to uniform and shape the first beam 101. The diffuser 160 is disposed at the downstream (or upstream) of the optical path with respect to the microlens array 120 to promote the uniformity of the first beam 101. The dichroic member 170 reflects at least a portion of the first beam 101, which is uniformed by the microlens array 120, to the first lens set 130. The first lens set 130 focuses the first beam 101 reflected from the dichroic member 170 onto the wavelength conversion unit 140A, so that the first beam 101 is incident on the reflective surface 145 and the wavelength conversion layer 144 at the same time. The portion of the first beam 101 incident on the reflective surface 145 is reflected from the reflective surface 145 and transmits through the first lens set 130, and then bypasses the dichroic member 170 from the upper side to form the first beam 101 not converted by the wavelength conversion unit 140A (i.e., non-converted first beam). At the same time, the wavelength conversion layer 144 is excited by the portion of the first beam 101 incident on the wavelength conversion layer 144 to generate the second beam 102 (e.g., yellow light) toward the first lens set 130. The second beam 102 transmits through the first lens set 130 and then transmits through or bypass the dichroic member 170, so as to form the illumination light 105 with the non-converted first beam 101. With such a configuration, the light source module 100A can provide a white illumination light 105 in a non-sequential manner.

Figure 6:
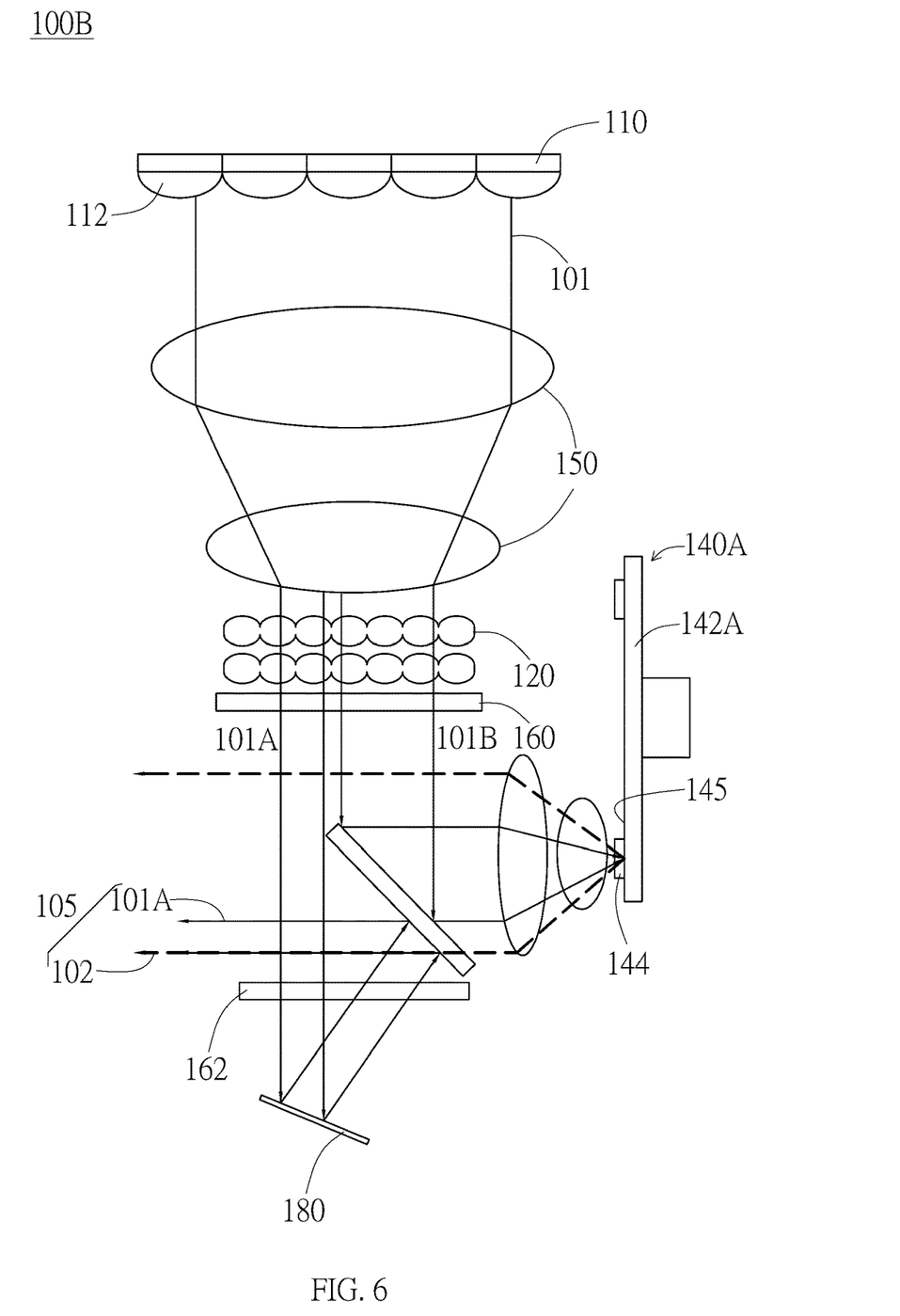
FIGS. 6 and 7 are schematic views of the light source module in other embodiments of the invention.

In another embodiment, as shown in FIG. 6, in addition to the dichroic member 170, the light source module 100B further includes a reflector 180. Corresponding to the disposition of the reflector 180, the light source module 100B may optionally include a diffuser 162. Hereinafter, the difference between the embodiment of FIG. 6 and the previous embodiments will be described, and the details of other elements (e.g., the light source 110, the lens sets 130, 150, the microlens array 120, the wavelength conversion unit 140A, the diffuser 160, the dichroic member 170) can be referred to the related descriptions of the previous embodiments and will not elaborate again.

In this embodiment, the reflector 180 can be embodied as an optical element, such as reflective mirror or reflective sheet, which is configured to reflect the first beam 101. The reflector 180 is disposed at another side of the dichroic member 170 opposite to the first lens set 170. In this embodiment, the reflective surface of the reflector 180 preferably faces toward the dichroic member 170, so that the reflector 180 can reflect the beam to the dichroic member 170. In an embodiment, the reflector 180 is preferably inclined with respect to the dichroic member 170, and the diffuser 162 is disposed between the reflector 180 and the dichroic member 170, so that the beam incident on the reflector 180 and reflected therefrom can be uniformed by the diffuser 162.

With the disposition of the reflector 180, the dichroic member 170 is shifted with respect to the microlens array 120 (or diffuser 160), so that a portion of the first beam 101 uniformed by the microlens array 120 can bypass the dichroic member 170 to firstly arrive the reflector 180, i.e., the portion of the first beam 101 without interfering with the dichroic member 170 before arriving the reflector 180, then is reflected from the reflector 180 to the dichroic member 170, and is reflected from the dichroic member 170 to form the first beam 101 that is not converted by the wavelength conversion unit 140A (i.e., non-converted first beam). Another portion of the first beam 101 uniformed by the microlens array 120 is reflected from the dichroic member 170 to the first lens set 130 and focused onto the wavelength conversion unit 140A by the first lens set 130, so that the wavelength conversion layer 144 is excited to generate the second beam 102. In this embodiment, the non-converted first beam 101 in the illumination light 105 is the first beam 101 reflected from the reflector 180, and the first beam 101 reflected from the dichroic member 170 to the first lens set 130 can be configured to generate the second beam 102 only. That is, the irradiation range 147 of the first bean 101 on the wavelength conversion unit 140A can cover only the wavelength conversion layer 144 only, and the dichroic member 170 can be disposed co-axis or off-axis with respect to the first lens set 130, i.e., the central axes of the dichroic member 170 and the first lens set 130 can overlap or not overlap with each other.

Referring to FIG. 6, the optical path of the light source module 100B for providing a white illumination light 105 will be described. As shown in FIG. 6, the first beam 101 (e.g., blue light) provided by the light source 110 is focused on the microlens array 120 by the third lens set 150. The first beam 101 is split into multiple first sub-beams 1011 (referring to FIG. 2) by the microlens array 120 so as to uniform and shape the first beam 101. The diffuser 160 is disposed at the downstream (or upstream) of the optical path with respect to the microlens array 120 to promote the uniformity of the first beam 101. In this embodiment, the first beam 101, which is uniformed by the microlens array 120 (or the diffuser 160), can be divided into a first portion of the first beam 101A and a second portion of the first beam 101B. The first portion of the first beam 101A after being uniformed by the diffuser 162 is incident on the reflector 180 without interfering with the dichroic member 170, i.e., bypassing the dichroic member 170. The reflector 180 reflects the first portion of the first beam 101A, which is then uniformed by the diffuser 162 and is incident on the dichroic member 170. The dichroic member 170 reflects the first portion of the first beam 101A, which is reflected from the reflector 180, to a predetermined direction, so as to form the first beam 101, which is not converted by the wavelength conversion unit 140A. That is, the non-converted first beam 101 is the first portion of the first beam 101A.

The second portion of the first beam 101B is reflected from the dichroic member 170 to the first lens set 130. The first lens set 130 focuses the second portion of the first beam 101B reflected from the dichroic member 170 onto the wavelength conversion unit 140A, so that the second portion of the first beam 101B is incident on the wavelength conversion layer 144. The wavelength conversion layer 144 is excited by the second portion of the first beam 101B to generate the second beam 102 (e.g., yellow light) toward the first lens set 130. The second beam 102 transmits through the first lens set 130 and then at least partially transmits through the dichroic member 170, so as to form the illumination light 105 with the non-converted first beam 101 (e.g. the first portion of the first beam 101A). With such a configuration, the light source module 100B can provide a white illumination light 105 in a non-sequential manner.

Figure 7:
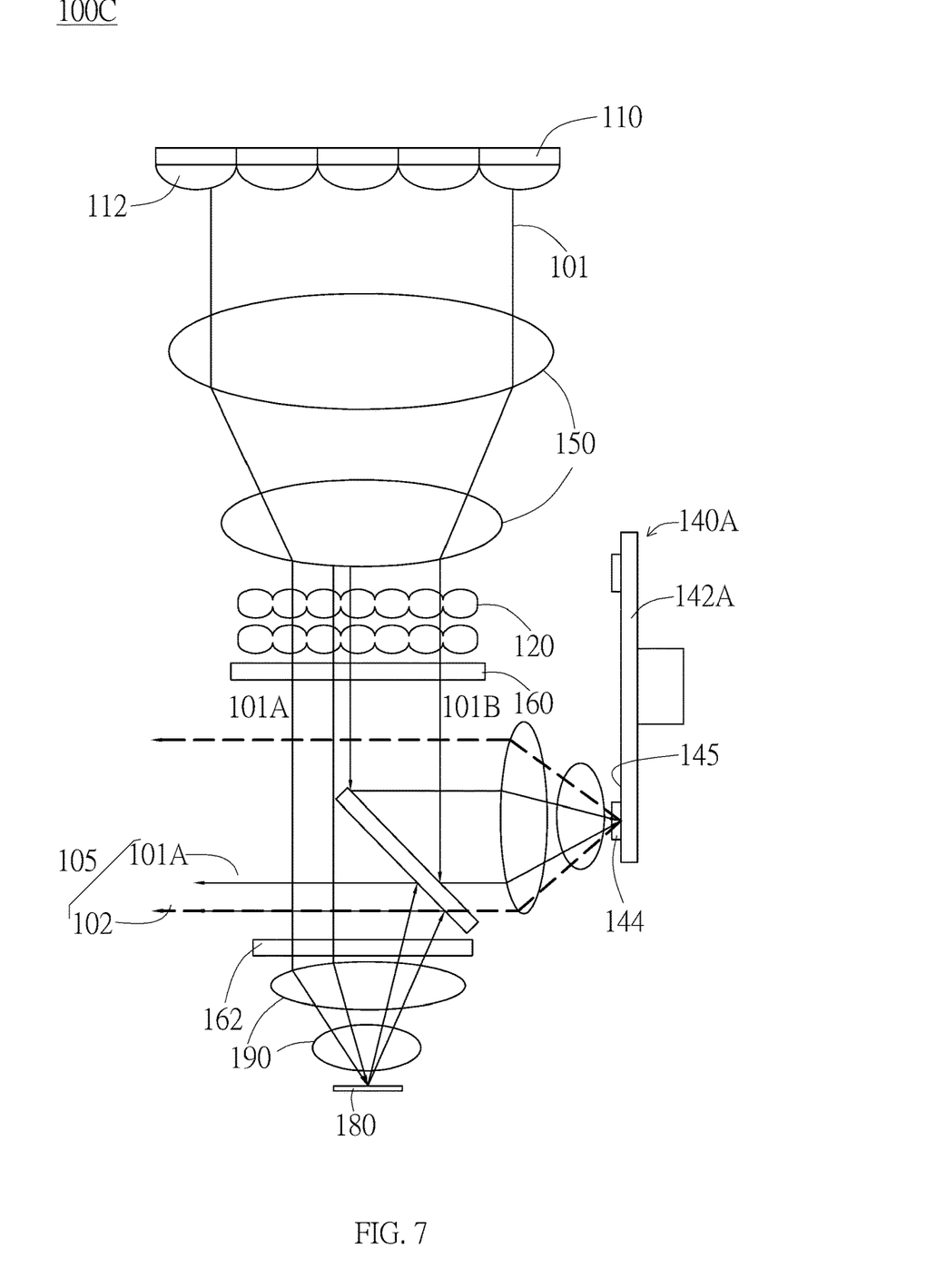

In another embodiment, as shown in FIG. 7, the light source module 100C further includes a second lens set 190. The second lens set 190 is disposed between the dichroic member 170 and the reflector 180 and configured to focus the first beam 101, which bypasses the dichroic member 170, onto the reflector 180. Specifically, with the disposition of the second lens set 190, not only can the concentration of the light beam be improved, but also the relative position between the reflector 180 and the dichroic member 170 can be modified accordingly for different spatial designs. Hereinafter, the difference between the embodiment of FIG. 7 and the previous embodiments will be described, and the details of other elements (e.g., the light source 110, the lens sets 130, 150, the microlens array 120, the wavelength conversion unit 140A, the diffusers 160, 162, the dichroic member 170, the reflector 180) can be referred to the related descriptions of the previous embodiment and will not elaborate again.

Referring to FIG. 7, the optical path of the light source module 100C for providing a white illumination light 105 will be described. As shown in FIG. 7, the first beam 101 (e.g., blue light) provided by the light source 110 is focused on the microlens array 120 by the third lens set 150. The first beam 101 is split into multiple first sub-beams 1011 (referring to FIG. 2) by the microlens array 120 so as to uniform and shape the first beam 101. The diffuser 160 is disposed at the downstream (or upstream) of the optical path with respect to the microlens array 120 to promote the uniformity of the first beam 101. In this embodiment, the first beam 101, which is uniformed by the microlens array 120 (or the diffuser 160) can be divided into a first portion of the first beam 101A and a second portion of the first beam 101B. The first portion of the first beam 101A after being uniformed by the diffuser 162 is incident on the second lens set 190 without interfering with the dichroic member 170. The second lens set 190 focuses the first portion of the first beam 101A on the reflector 180. The reflector 180 reflects the first portion of the first beam 101A, which is then focused by the second lens set 190 and uniformed by the diffuser 162 and is incident on the dichroic member 170. The dichroic member 170 reflects the first portion of the first beam 101A, which is reflected from the reflector 180, to a predetermined direction, so as to form the first beam 101 that is not converted by the wavelength conversion unit 140A. That is, the non-converted first beam 101 is the first portion of the first beam 101A.

In this embodiment, the second portion of the first beam 101B travels along an optical path similar to the embodiment of FIG. 6, which is not elaborated again. That is, the second portion of the first beam 101B is reflected by the dichroic member 170 and focused by the first lens set 130, and the wavelength conversion unit 140A is excited by the second portion of the first beam 101B to generate the second beam 102 (e.g., yellow light). The second beam 102 transmits through the first lens set 130 and the dichroic member 170, so as to form the illumination light 105 with the first portion of the first beam 101A, which is reflected from the reflector 180. With such a configuration, the light source module 100C can provide a white illumination light 105 in a non-sequential manner.

Figure 8:
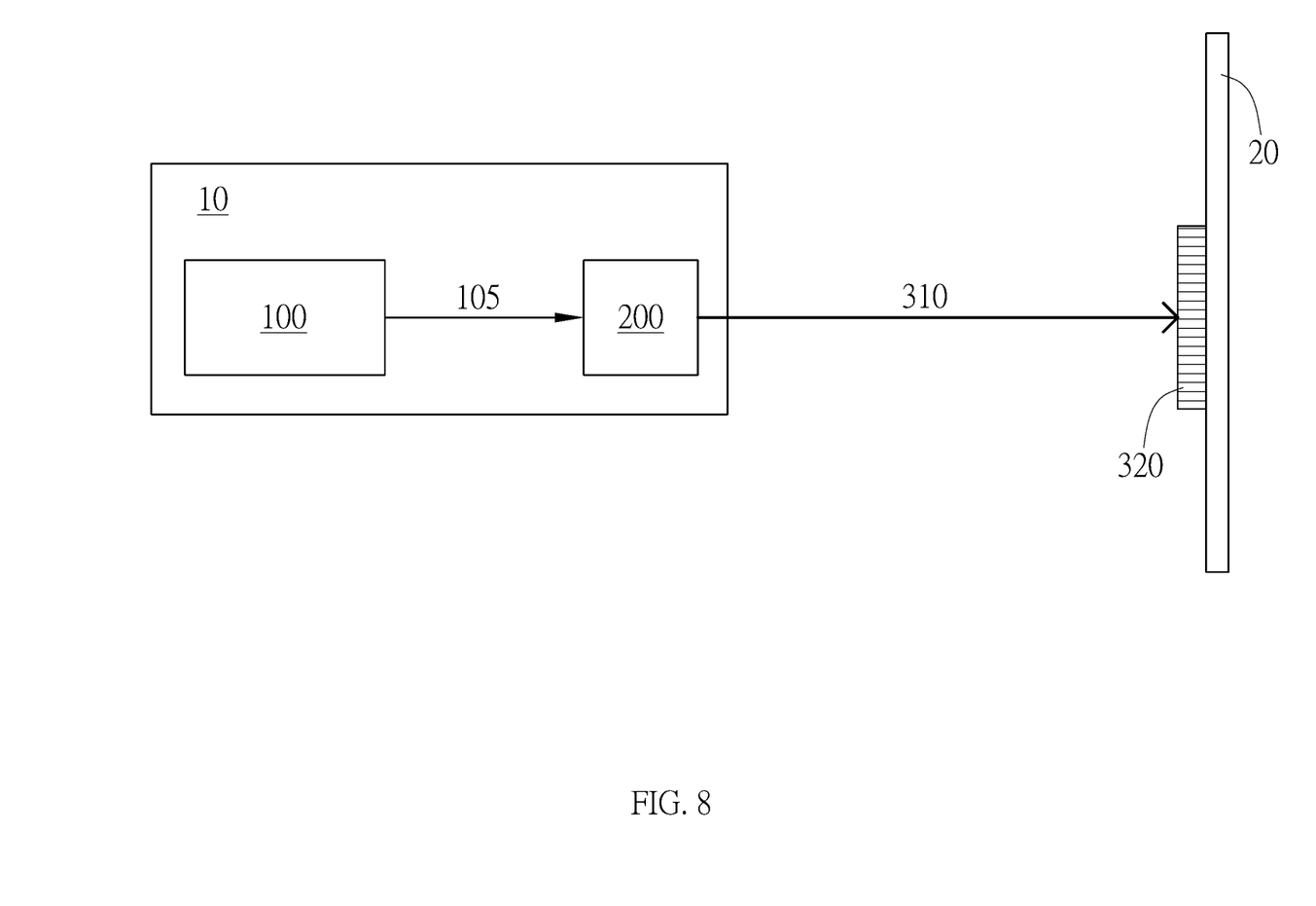
FIG. 8 is a schematic view of the projection device in an embodiment of the invention.

FIG. 8 is a schematic view of the projection device in an embodiment of the invention. As shown in FIG. 8, in an embodiment, the projection device 10 includes any one of the light source modules 100, 100A, 100B, 100C and a light processing unit 200. In this embodiment, the light source module 100 of FIG. 1 is illustrated. The light processing unit 200 is configured to receive the illumination light 105 to form an image light 310, and the image light 310 forms an image 320 on a plane 20.

In this embodiment, the light processing unit 200 can be a controllable switch, such as liquid crystal light valve or a digital micromirror device (DMD), which is configured to transfer the illumination light 105 to the image light 310 according to the image signal. The image light 310 is then projected on the plane 20, such as a screen or a wall, to form the image 320. It is noted that the projection device 10 may include other suitable optical elements, such as one or more color wheels, lenses, mirrors, or condensers, to effectively form the image 320 on the plane 20.

Although the preferred embodiments of the present invention have been described herein, the above description is merely illustrative. The preferred embodiments disclosed will not limit the scope of the present invention. The terms "first" and "second" mentioned in this specification or the claims are merely used to distinguish or name individual components, not to limit the upper or lower limit of the number of elements. Further modification of the invention herein disclosed will occur to those skilled in the respective arts and all such modifications are deemed to be within the scope of the invention as defined by the appended claims.

What is claimed is:

1. A light source module for providing an illumination light, comprising:
    a light source configured to provide a first beam of a first waveband;
    a microlens array disposed corresponding to the light source and configured to uniform the first beam;
    a first lens set configured to focus at least a portion of the first beam uniformed by the microlens array; and
    a wavelength conversion unit configured to convert at least a portion of the first beam focused by the first lens set into a second beam of a second waveband different from the first waveband, wherein the wavelength conversion unit comprises:
        a substrate having a light-transparent portion, the light-transparent portion configured to allow the first beam to transmit therethrough;
        a wavelength conversion layer disposed on the substrate, the light-transparent portion at least partially overlapping the wavelength conversion layer; and a dichroic film disposed on the substrate and partially located between the light-transparent portion and the wavelength conversion layer, wherein the first beam transmits through the light-transparent portion to the wavelength conversion layer, so that the wavelength conversion layer is excited by the first beam to generate the second beam, wherein the dichroic film is configured to allow the first beam to transmit therethrough and reflect the second beam, wherein the second beam and the first beam not converted by the wavelength conversion unit together form the illumination light.

2. The light source module of claim 1, wherein the microlens array comprises multiple microlens elements; the microlens array uniforms the first beam by splitting the first beam into multiple first sub-beams of the first waveband by the microlens elements.

3. The light source module of claim 1, wherein the first beam not converted by the wavelength conversion layer is a portion of the first beam transmitting through a portion of the light-transparent portion not overlapping the wavelength conversion layer or a portion of the first beam transmitting through the light-transparent portion and the wavelength conversion layer without being converted by the wavelength conversion layer.

4. A light source module for providing an illumination light, comprising:
a light source configured to provide a first beam of a first waveband;
a microlens array disposed corresponding to the light source and configured to uniform the first beam;
a first lens set configured to focus at least a portion of the first beam uniformed by the microlens array;
a wavelength conversion unit configured to convert at least a portion of the first beam focused by the first lens set into a second beam of a second waveband different from the first waveband; and
a dichroic member disposed between the microlens array and the first lens set, wherein the dichroic member is configured to reflect at least a portion of the first beam uniformed by the microlens array, and the second beam at least partially transmits through the dichroic member from the first lens set, wherein the second beam and the first beam not converted by the wavelength conversion unit together form the illumination light.

5. The light source module of claim 4, wherein the wavelength conversion unit comprises:
a substrate having a reflective surface, the reflective surface configured to reflect the first beam; and
a wavelength conversion layer disposed on the substrate adjacent to the reflective surface,
wherein the first beam is incident on the reflective surface and the wavelength conversion layer at the same time, so that the wavelength conversion layer is excited by the first beam to generate the second beam toward a predetermined direction, and a first central axis of the first lens set and a second central axis of the dichroic member is shifted from each other, so that the first beam is partially reflected from the reflective surface, transmits through the first lens set, and bypasses the dichroic member to form the first beam not converted by the wavelength conversion unit.

6. The light source module of claim 4, further comprising a reflector disposed at another side of the dichroic member opposite to the first lens set; the first beam uniformed by the microlens array partially bypasses the dichroic member to the reflector, and is then reflected from the reflector to the dichroic member to be reflected from the dichroic member to form the first beam not converted by the wavelength conversion unit.

7. The light source module of claim 6, further comprising a second lens set disposed between the dichroic member and the reflector, wherein the second lens set is configured to focus the first beam bypassing the dichroic member to the reflector.

8. The light source module of claim 7, further comprising at least a diffuser disposed at least between the light source and the microlens array, between the microlens array and the first lens set, between the microlens array and the dichroic member, and/or between the dichroic member and the reflector.

9. The light source module of claim 1, further comprising a third lens set disposed between the light source and the microlens array and configured to focus the first beam provided by the light source.

10. The light source module of claim 1, wherein the first beam is a blue light, the second beam is a yellow light, and the illumination light is a white light.

11. A projection device, comprising:
a light source module for providing an illumination light, comprising:
a light source configured to provide a first beam of a first waveband;
a microlens array disposed corresponding to the light source and configured to uniform the first beam;
a first lens set configured to focus at least a portion of the first beam uniformed by the microlens array; and
a wavelength conversion unit configured to convert at least a portion of the first beam focused by the first lens set into a second beam of a second waveband different from the first waveband, wherein the wavelength conversion unit comprises:
a substrate having a light-transparent portion, the light-transparent portion configured to allow the first beam to transmit therethrough;
a wavelength conversion layer disposed on the substrate, the light-transparent portion at least partially overlapping the wavelength conversion layer; and
a dichroic film disposed on the substrate and partially located between the light-transparent portion and the wavelength conversion layer, wherein the first beam transmits through the light-transparent portion to the wavelength conversion layer, so that the wavelength conversion layer is excited by the first beam to generate the second beam, wherein the dichroic film is configured to allow the first beam to transmit therethrough and reflect the second beam, wherein the second beam and the first beam not converted by the wavelength conversion unit together form the illumination light; and
a light processing unit configured to receive the illumination light to form an image light, wherein the image light forms an image on a plane.

12. The projection device of claim 11, wherein the microlens array comprises multiple microlens elements; the microlens array uniforms the first beam by splitting the first beam into multiple first sub-beams of the first waveband by the microlens elements.

13. The projection device of claim 11, wherein the first beam not converted by the wavelength conversion layer is a portion of the first beam transmitting through a portion of the light-transparent portion not overlapping the wavelength conversion layer or a portion of the first beam transmitting through the light-transparent portion and the wavelength conversion layer without being converted by the wavelength conversion layer.

14. A projection device, comprising:
   a light source module for providing an illumination light, comprising:
      a light source configured to provide a first beam of a first waveband;
      a microlens array disposed corresponding to the light source and configured to uniform the first beam;
      a first lens set configured to focus at least a portion of the first beam uniformed by the microlens array;
      a wavelength conversion unit configured to convert at least a portion of the first beam focused by the first lens set into a second beam of a second waveband different from the first waveband; and
      a dichroic member disposed between the microlens array and the first lens set, wherein the dichroic member is configured to reflect at least a portion of the first beam uniformed by the microlens array, and the second beam at least partially transmits through the dichroic member from the first lens set, wherein the second beam and the first beam not converted by the wavelength conversion unit together form the illumination light; and
   a light processing unit configured to receive the illumination light to form an image light, wherein the image light forms an image on a plane.

15. The projection device of claim 14, wherein the wavelength conversion unit comprises:
   a substrate having a reflective surface, the reflective surface configured to reflect the first beam; and
   a wavelength conversion layer disposed on the substrate adjacent to the reflective surface,
   wherein the first beam is incident on the reflective surface and the wavelength conversion layer at the same time, so that the wavelength conversion layer is excited by the first beam to generate the second beam toward a predetermined direction, and a first central axis of the first lens set and a second central axis of the dichroic member is shifted from each other, so that the first beam is partially reflected from the reflective surface, transmits through the first lens set, and bypasses the dichroic member to form the first beam not converted by the wavelength conversion unit.

16. The projection device of claim 14, further comprising a reflector disposed at another side of the dichroic member opposite to the first lens set; the first beam uniformed by the microlens array partially bypasses the dichroic member to the reflector, and is then reflected from the reflector to the dichroic member to be reflected from the dichroic member to form the first beam not converted by the wavelength conversion unit.

* * * * *